United States Patent
Murayama et al.

(10) Patent No.: US 9,726,285 B2
(45) Date of Patent: Aug. 8, 2017

(54) PISTON PUSH ROD ASSEMBLY, MASTER CYLINDER, AND MANUFACTURING METHOD FOR PISTON PUSH ROD ASSEMBLY

(71) Applicants: HONDA MOTOR CO., LTD., Minato-Ku, Tokyo (JP); NISSIN KOGYO CO., LTD., Ueda-shi, Nagano (JP)

(72) Inventors: Kazuaki Murayama, Wako (JP); Jiro Suzuki, Wako (JP); Takaaki Ohnishi, Wako (JP); Motoyasu Nakamura, Ueda (JP); Yoshiyuki Takamatsu, Ueda (JP); Kazuhiro Tagata, Ueda (JP)

(73) Assignees: Honda Motor Co., Ltd., Tokyo (JP); Autoliv Nissin Brake Systems Japan Co., Ltd., Nagano (JP)

( * ) Notice: Subject to any disclaimer, the term of this patent is extended or adjusted under 35 U.S.C. 154(b) by 300 days.

(21) Appl. No.: 14/387,671

(22) PCT Filed: Mar. 29, 2013

(86) PCT No.: PCT/JP2013/059715
§ 371 (c)(1),
(2) Date: Sep. 24, 2014

(87) PCT Pub. No.: WO2013/147246
PCT Pub. Date: Oct. 3, 2013

(65) Prior Publication Data
US 2015/0075370 A1    Mar. 19, 2015

(30) Foreign Application Priority Data
Mar. 30, 2012    (JP) ................................. 2012-083301

(51) Int. Cl.
*F16J 1/14* (2006.01)
*B60T 7/04* (2006.01)
(Continued)

(52) U.S. Cl.
CPC ................. *F16J 1/14* (2013.01); *B23P 15/10* (2013.01); *B60T 7/04* (2013.01); *B60T 7/042* (2013.01);
(Continued)

(58) Field of Classification Search
CPC .. B23P 15/10; B60T 7/04; B60T 7/042; B60T 11/18; B60T 13/146; B60T 13/662;
(Continued)

(56) References Cited

U.S. PATENT DOCUMENTS 4,955,353 A * 9/1990 Amataka .................... F02F 3/12
123/193.6
5,199,166 A * 4/1993 Torigai .................. F02B 75/007
123/193.2
(Continued)

FOREIGN PATENT DOCUMENTS

DE    19755772 A1    6/1999
EP    0008222 A1    2/1980
(Continued)

OTHER PUBLICATIONS

Extended supplementary Search Report issued Nov. 5, 2015 for corresponding European Patent Application No. 13 769 308.1.

*Primary Examiner* — Logan Kraft
(74) *Attorney, Agent, or Firm* — Carrier Blackman & Associates, P.C.; Joseph P. Carrier; Jingli Wang (57) ABSTRACT

Provided is a piston push rod assembly which can prevent discomfort from being imparted during the operation of a brake pedal by a driver. A piston push rod assembly, wherein: a second piston is provided with a piston slide
(Continued)

section which is housed in a cylinder and which slides relative to the cylinder, and a connection tube section which is connected to a push rod; the piston slide section is covered by metal plating; the connection tube section has a non-plated section; and the second piston and the push rod are connected by the caulking of the connection tube section when the push rod has been inserted inside the connection tube section.

13 Claims, 7 Drawing Sheets (51) Int. Cl.
- *B60T 11/18* (2006.01)
- *B60T 13/66* (2006.01)
- *B60T 13/68* (2006.01)
- *B60T 13/14* (2006.01)
- *B23P 15/10* (2006.01)

(52) U.S. Cl.
CPC ............ *B60T 11/18* (2013.01); *B60T 13/146* (2013.01); *B60T 13/662* (2013.01); *B60T 13/686* (2013.01); *Y10T 29/49252* (2015.01)

(58) Field of Classification Search
CPC ..... B60T 13/686; F16J 1/14; Y10T 29/49252; Y10T 29/49261; Y10T 29/49263
See application file for complete search history.

(56) References Cited

U.S. PATENT DOCUMENTS

| 5,425,286 | A | 6/1995 | Laue |
| 5,606,790 | A | 3/1997 | Laue |
| 6,412,882 | B1* | 7/2002 | Isono ................. B60K 6/22 303/11 |
| 7,685,710 | B2* | 3/2010 | Scharp ................. B21K 1/185 29/888.04 |

FOREIGN PATENT DOCUMENTS

| JP | S58-89451 A | 5/1983 |
| JP | H09-30400 A | 2/1997 |
| JP | 2007-099057 A | 4/2007 |

* cited by examiner

PISTON PUSH ROD ASSEMBLY, MASTER CYLINDER, AND MANUFACTURING METHOD FOR PISTON PUSH ROD ASSEMBLY

TECHNICAL FIELD

The present invention relates to a piston push-rod assembly in which a piston for a master cylinder is connected to a push rod, a master cylinder including the piston push-rod assembly, and a method for manufacturing the piston push-rod assembly.

BACKGROUND ART

Conventionally, the so-called plunger-type master cylinder, in which a sealing member is arranged in a recess formed on an inner circumferential surface of a cylinder, is known. (See Patent Literature 1.)

CITATION LIST

Patent Literature

Patent Literature 1: Japanese Patent Laid-Open No. 2007-99057

SUMMARY OF INVENTION

Technical Problem

Incidentally, the aforementioned piston is connected to the brake pedal through a push rod, and the piston and the push rod are connected by clamping. However, in the case where the piston is plated for rust prevention, when cracks or exfoliation of the plating is caused by clamping, the cracks or exfoliation affects the rotational motion of the push rod, and can therefore cause the driver to feel a sense of incongruity.

The present invention is made in view of above, and the object of the present invention is to provide a piston push-rod assembly, a master cylinder, and a method for manufacturing the piston push-rod assembly, where the piston push-rod assembly which can prevent causing the driver to feel a sense of incongruity when the driver manipulates the brake pedal.

Solution to Problem

In order to accomplish the above object, according to the present invention, a piston push-rod assembly in which a piston for a master cylinder is connected to a push rod is provided. The piston push-rod assembly is characterized in that the piston includes a piston sliding portion which is contained in a cylinder and slides relative to the cylinder, and a tubular connection portion which is connected to the push rod, where the piston sliding portion is coated with plating, and the tubular connection portion includes an unplated portion.

In the above structure, since the piston sliding portion is coated with plating and the tubular connection portion is an unplated portion exposed from the plating, it is possible to prevent cracks and exfoliation of the plating which can be caused by clamping or the like, and also prevent causing the driver to feel a sense of incongruity when the driver manipulates the brake pedal.

Preferably, the unplated portion is arranged on an inner circumferential surface and an outer circumferential surface of the tubular connection portion.

Preferably, the tubular connection portion has a diameter smaller than the piston sliding portion, and the plating is arranged on an area extending from an outer circumferential surface of the piston sliding portion to a connection surface connecting the outer circumferential surface of the piston sliding portion and an outer circumferential surface of the tubular connection portion.

In the above structure, since the area extending from the outer circumferential surface of the piston sliding portion to the connection surface connecting the outer circumferential surface of the piston sliding portion and the outer circumferential surface of the tubular connection portion is coated with the plating, it is possible to improve the resistance to exfoliation of the plating.

The piston push-rod assembly may have the following structure. That is, the piston push-rod assembly further includes a cover member which covers the tubular connection portion, the tubular connection portion has a diameter smaller than the piston sliding portion, the cover member has a cylindrical shape with a bottom, a bore is formed in the bottom, the piston rod is inserted through the bore, and an end portion of the cover member on an opening side abuts a connection surface connecting the outer circumferential surface of the piston sliding portion and an outer circumferential surface of the tubular connection portion.

In the above structure, since the piston push-rod assembly is provided with the cover member, it is possible to prevent rusting of the tubular connection portion exposed from the plating, and also prevent intrusion of foreign substances into the tubular connection portion.

Preferably, a waist portion, which an inner circumferential surface of the bore abuts, is formed on an outer circumferential surface of the piston rod.

In the above structure, since the inner circumferential surface of the bore in the cover member abuts the waist portion, it is possible to improve the sealability.

In addition, according to the present invention, a master cylinder including the piston push-rod assembly described above and a cylinder containing the piston sliding portion is provided. The master cylinder is characterized in further including a sealing member which is received in a recess formed on an inner circumferential surface of the cylinder.

In addition, according to the present invention, a method for manufacturing a piston push-rod assembly in which a piston for a master cylinder is connected to a push rod is provided. The method is characterized in including: a plating step of plating a piston part; a cutting step of producing the piston including a tubular connection portion, by cutting the piston part which is coated with plating, where the tubular connection portion includes an unplated portion; and a connecting step of connecting the piston with the push rod in a state in which the push rod is inserted in the tubular connection portion.

Preferably, in the cutting step, the tubular connection portion is formed, by cutting, to partially remove the plating and form a recess in an end portion of the piston part.

It is preferable that the above piston part include a large-diameter portion and a small-diameter portion which are integrally formed, and a piston sliding portion which is contained in a cylinder and slides relative to the cylinder be produced from the large-diameter portion, and a tubular connection portion connected to the push rod be produced from the small-diameter portion, by preserving the plating in an area from an outer circumferential surface of the large-diameter portion to a connection surface connecting the outer circumferential surface of the large-diameter portion and an outer circumferential surface of the small-diameter portion, in the cutting step.

Further, according to the present invention, a method for manufacturing a piston push-rod assembly in which a piston for a master cylinder is connected to a push rod is provided. The method is characterized in including: a piston production step of producing the piston including a tubular connection portion, by plating a piston part with masking, where the tubular connection portion includes an unplated portion; and a connection step of connecting the piston with the push rod in a state in which the push rod is inserted in the tubular connection portion.

Effect of Invention

According to the present invention, it is possible to prevent causing the driver to feel a sense of incongruity when the driver manipulates the brake pedal.

BRIEF DESCRIPTION OF DRAWINGS

FIGS. 4A and 4B include diagrams illustrating a piston push-rod assembly, where

FIGS. 7A to 7C are diagrams illustrating the piston push-rod assembly according to an embodiment of the present invention provided with a cover member, where

DESCRIPTION OF EMBODIMENTS

Figure 1:
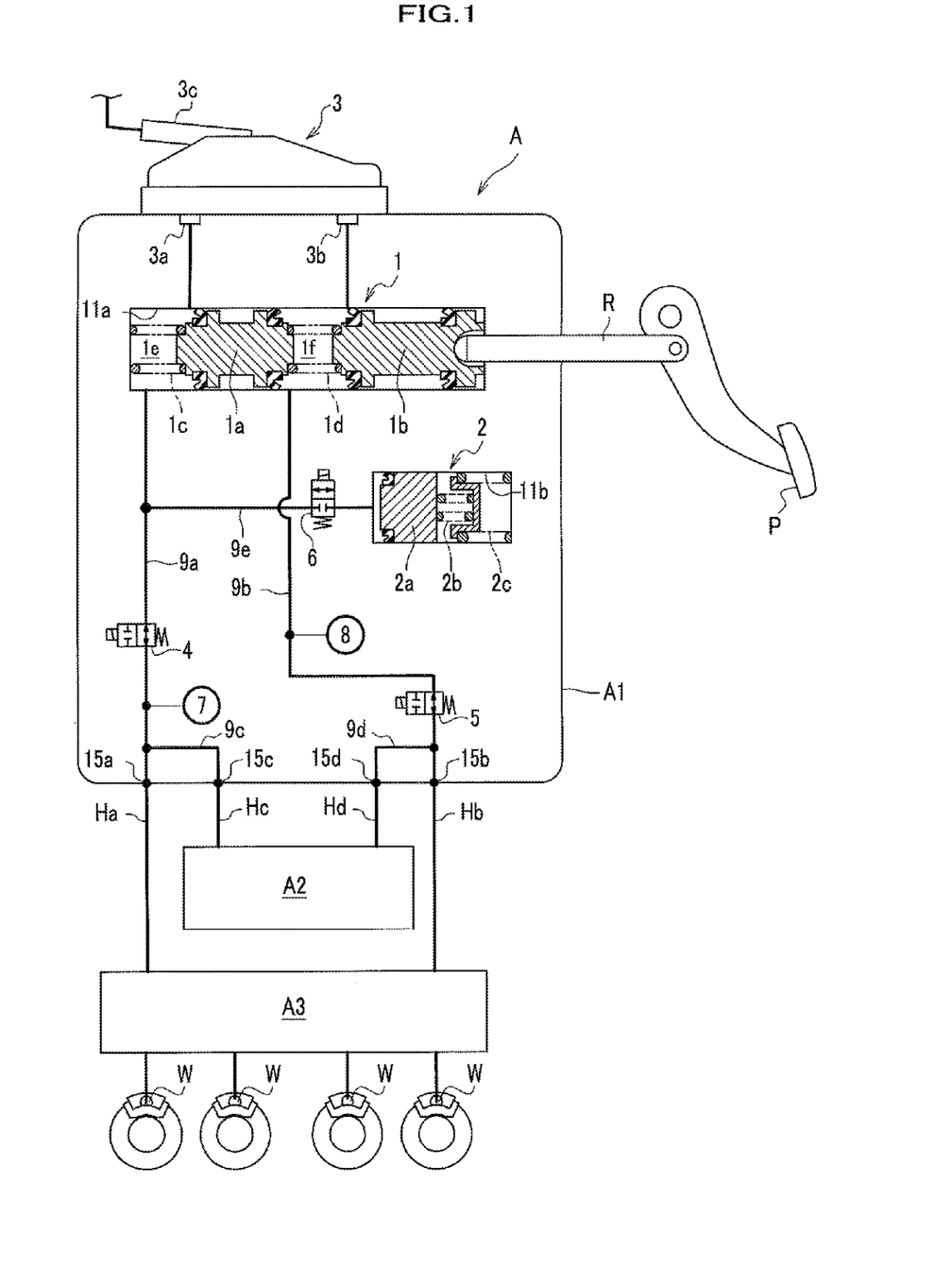
FIG. 1 is a schematic construction diagram of a vehicle brake system including a master cylinder device according to an embodiment of the present invention to which a housing is attached.

The vehicle brake system A illustrated in FIG. 1 includes both of a by-wire brake system which operates when a prime mover (an engine, an electric motor, or the like) is started and a hydraulic brake system which operates at times of emergency or stop of the prime mover. The vehicle brake system A includes a master cylinder device A1, a motor cylinder device A2, and a vehicle stability assist device A3. The master cylinder device A1 generates a hydraulic brake pressure according to the tread force with which the brake pedal P (as a brake manipulator) is depressed, the motor cylinder device A2 generates a hydraulic brake pressure by use of an electric motor (not shown), and the hydraulic control device A3 assists in stabilization of the vehicle behavior. (Hereinafter, the vehicle stability assist device A3 is referred to as the hydraulic control device A3.) The master cylinder device A1, the motor cylinder device A2, and the hydraulic control device A3 are respectively configured in the forms of separate units, and are connected through external piping.

The vehicle brake system A can be mounted on vehicles including the automobiles powered by only an engine (internal-combustion engine), hybrid electric vehicles using electric motors as well as an engine, electric vehicles, fuel-cell vehicles, and the like which use only electric motors as power sources.

The master cylinder device A1 includes a tandem-type master cylinder 1, a stroke simulator 2, a reservoir 3, normally-open shutoff valves (solenoid valves) 4 and 5, a normally-close shutoff valve (solenoid valve) 6, pressure sensors 7 and 8, main hydraulic paths 9a and 9b, hydraulic communication paths 9c and 9d, and a hydraulic branch path 9e.

The master cylinder 1 converts the tread force on the brake pedal P into the hydraulic brake pressure. The master cylinder 1 includes a first piston 1a, a second piston 1b, a first return spring 1c, and a second return spring 1d. The first piston 1a is arranged on the bottom surface side of a first cylinder bore 11a, the second piston 1b is connected to a push rod R, the first return spring 1c is arranged between the first piston 1a and the bottom surface of the first cylinder bore 11a and the second return spring 1d is arranged between the pistons 1a and 1b. The second piston 1b is connected through the push rod R to the brake pedal P. The pistons 1a and 1b slide in response to the tread force from the brake pedal P, and pressurize the brake fluid in pressure chambers 1e and 1f. The pressure chambers 1e and 1f communicate with the main hydraulic paths 9a and 9b.

The stroke simulator 2 generates a simulated reaction force in response to a manipulation, and includes a piston 2a and large and small return springs 2b and 2c. The piston 2a slides in a second cylinder bore 11b. The return springs 2b and 2c bias the piston 2a. The stroke simulator 2 communicates with the pressure chamber 1e through the main hydraulic path 9a and the hydraulic branch path 9e, so that the hydraulic brake pressure generated in the pressure chamber 1e actuates the stroke simulator 2.

The reservoir 3 is a container reserving the brake fluid. The reservoir 3 includes oil feeding ports 3a and 3b connected to the master cylinder 1, and a tube connection port 3c to which a hose extended from a main reservoir (not shown) is connected.

The normally-open shutoff valves 4 and 5 open and close the main hydraulic paths 9a and 9b, and are realized by normally-open solenoid valves. The normally-open shutoff valve 4 opens and closes the main hydraulic path 9a in the section from the intersection point of the main hydraulic path 9a and the hydraulic branch path 9e to the intersection point of the main hydraulic path 9a and the hydraulic communication path 9c. The normally-open shutoff valve 5 opens and closes the main hydraulic path 9b on the upstream side of the intersection point of the main hydraulic path 9b and the hydraulic communication path 9d.

The normally-close shutoff valve 6 opens and closes the hydraulic branch path 9e, and is realized by a normally-closed solenoid valve.

The pressure sensors 7 and 8 detect the magnitude of the hydraulic brake pressure, and are fitted to sensor installation bores (not shown) which communicate with the main hydraulic paths 9a and 9b. The pressure sensor 7 is arranged on the downstream side of the normally-open shutoff valve 4, and detects the hydraulic brake pressure generated in the motor cylinder device A2 when the normally-open shutoff valve 4 is in a closed state (in the state in which the main hydraulic path 9a is shut off). The pressure sensor 8 is arranged on the upstream side of the normally-open shutoff valve 5, and detects the hydraulic brake pressure generated in the master cylinder 1 when the normally-open shutoff valve 5 is in a closed state (in the state in which the main hydraulic path 9b is shut off).

The information acquired by the pressure sensors 7 and 8 is outputted to an electronic control unit (ECU), which is not shown.

The main hydraulic paths 9a and 9b are hydraulic paths originated from the master cylinder 1. Tubes Ha and Hb extending to the hydraulic control device A3 are connected to output ports 15a and 15b, at which the main hydraulic paths 9a and 9b terminate.

The hydraulic communication paths 9c and 9d are hydraulic paths extending from input ports 15c and 15d to the main hydraulic paths 9a and 9b. Tubes Hc and Hd extending to the motor cylinder device A2 are connected to the input ports 15c and 15d.

The hydraulic branch path 9e is a hydraulic path which branches off from the main hydraulic path 9a, and extends to the stroke simulator 2.

The master cylinder device A1 communicates with the hydraulic control device A3 through the tubes Ha and Hb. The hydraulic brake pressure generated in the master cylinder 1 when the normally-open shutoff valves 4 and 5 are in an open state is inputted to the hydraulic control device A3 through the main hydraulic paths 9a and 9b and the tubes Ha and Hb.

Although not shown, the motor cylinder device A2 includes slave pistons, an actuator mechanism, and a reservoir. The slave pistons slide in the slave cylinder. The actuator mechanism includes an electric motor and a driving-force transmission portion. The above reservoir reserves the brake fluid in the slave cylinder. The electric motor operates on the basis of a signal from the electronic control unit (not shown). The driving-force transmission portion converts the rotational power of the electric motor into a forward or backward motion, and transmits the forward or backward motion to the slave pistons. When the slave pistons receive the driving force of the electric motor, the slave pistons slide in the slave cylinder and pressurize the brake fluid in the slave cylinder. The hydraulic brake pressure generated in the motor cylinder device A2 is inputted into the master cylinder device A1 through the tubes Hc and Hd, and is further inputted into the hydraulic control device A3 through the hydraulic communication paths 9c and 9d and the tubes Ha and Hb. A hose extended from the main reservoir (not shown) is connected to the above reservoir.

The hydraulic control device A3 has such a structure that antilock brake control (ABS control) for suppressing wheel slips, sideslip control and traction control for stabilizing the vehicle behavior, and the like can be performed. The hydraulic control device A3 is connected to the wheel cylinders W through tubes. Although not shown, the hydraulic control device A3 includes a hydraulic unit, electric motors, the electronic control unit (not shown), and the like, where solenoid valves, pumps, and the like are arranged in the hydraulic unit, the electric motors drive the pumps, and the electronic control unit controls the solenoid valves, the motors, and the like.

Next, operations of the vehicle brake system A are briefly explained below.

In the normal state, in which the vehicle brake system A normally operates, the normally-open shutoff valves 4 and 5 are closed, and the normally-close shutoff valve 6 is open. When the brake pedal P is manipulated in the above state, the hydraulic brake pressure generated in the master cylinder 1 is not transmitted to the wheel cylinders W, and is instead transmitted to the stroke simulator 2, so that the piston 2a is displaced. Therefore, a stroke of the brake pedal P is allowed and simulated reaction force in response to a manipulation of the brake pedal P is imparted to the brake pedal P.

In addition, when depressing of the brake pedal P is detected by a stroke sensor (not shown) or the like, the electric motor in the motor cylinder device A2 is driven, and the slave pistons are displaced, so that the brake fluid in both of the pressure chambers is pressurized.

The electronic control unit (not shown) compares the hydraulic brake pressure outputted from the motor cylinder device A2 (the hydraulic brake pressure detected by the pressure sensor 7) with the hydraulic brake pressure outputted from the master cylinder 1 (the hydraulic brake pressure detected by the pressure sensor 8), and controls the number of rotations and the like of the electric motor on the basis of the comparison result.

The hydraulic brake pressure generated in the motor cylinder device A2 is transmitted to the wheel cylinders W through the hydraulic control device A3, and the wheel cylinders W are actuated, so that braking forces are exerted on the respective wheels.

Further, in the situation in which the motor cylinder device A2 does not operate (e.g., in cases of emergency or loss of electric power), both of the normally-open shutoff valves 4 and 5 are brought into the open state, so that the hydraulic brake pressure generated in the master cylinder 1 is transmitted to the wheel cylinders W.

Next, a concrete construction of the master cylinder device A1 is explained below.

Figure 2A:
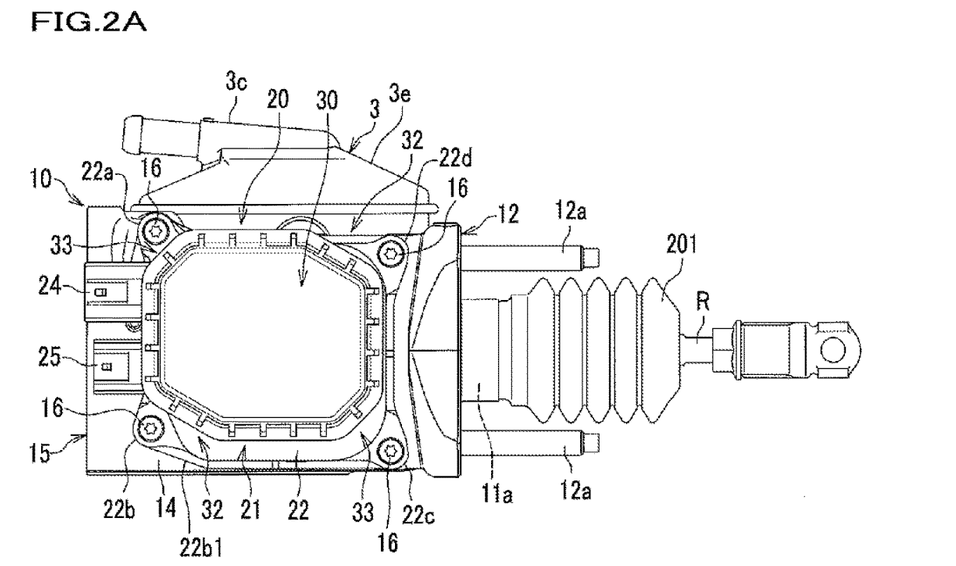
FIG. 2A is a side view of the master cylinder device.
Figure 2B:
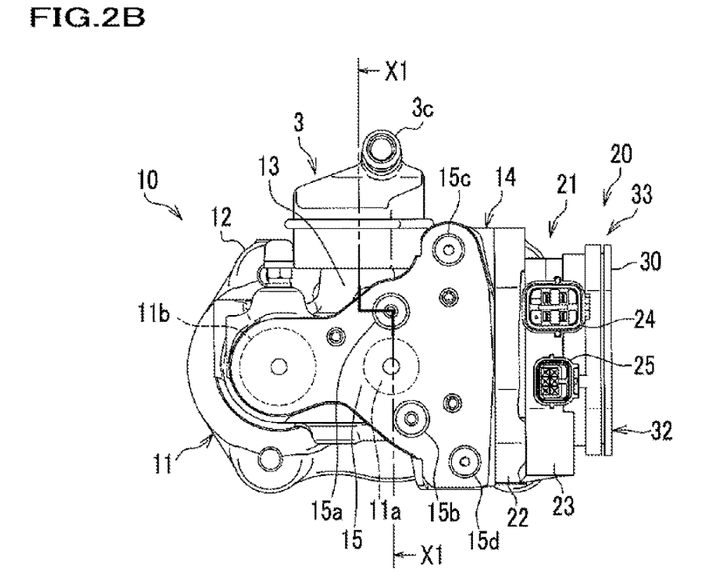
FIG. 2B is a front view of the master cylinder device.

The master cylinder device A1 according to the present embodiment is formed by installing various parts mentioned before inside or outside the base body 10 illustrated in FIGS. 2A and 2B, and covering, with a housing 20, the electrically operating components (the normally-open shutoff valves 4 and 5, the normally-closed shutoff valve 6, and the pressure sensors 7 and 8 illustrated in FIG. 1). In addition, mechanical components and the like may also be contained in the housing 20.

The base body 10 is a casting of an aluminum alloy, and includes a cylinder portion 11, a chassis fixing portion 12, reservoir mounting portions 13, a housing attaching portion 14, and a piping connection portion 15. (Hereinafter, see FIG. 2B for the cylinder portion 11 and the reservoir mounting portions 13.) In addition, bores (not shown) realizing the main hydraulic paths 9a and 9b and the hydraulic branch path 9e, and the like are formed inside the base body 10.

The first cylinder bore 11a for the master cylinder and the second cylinder bore 11b for the stroke simulator (which are illustrated by dashed lines in FIG. 2B) are formed in the cylinder portion 11. The cylinder bores 11a and 11b have the shape of a bottomed cylinder, are open to the chassis fixing portion 12, and are elongated toward the piping connection portion 15. The components constituting the master cylinder 1 as illustrated in FIG. 1 (i.e., the first piston 1a, the second piston 1b, the first return spring 1c, and the second return spring 1d) are inserted in the first cylinder bore 1a, and the components constituting the stroke simulator 2 (i.e., the piston 2a and the return springs 2b and 2c) are inserted in the second cylinder bore 11b.

The chassis fixing portion 12 is fixed to a chassis-side fixing position, which is, for example, the toe board (not shown). The vehicle fixing portion 12 is formed on the rear side of the base body 10, and has a flange-like shape. Bolt insertion bores (not shown) are formed in a peripheral portion of the vehicle fixing portion 12 for fixing with bolts 12a. (The peripheral portion is a portion which extends outward from the cylinder portion 11.)

As illustrated in FIG. 2B, the reservoir mounting portions 13 are portions arranged as mounting sheets for the reservoir 3, and two reservoir mounting portions are formed on the upper surface of the base body 10 (although only one of the reservoir mounting portions is illustrated). Reservoir union ports are arranged in the reservoir mounting portions 13. In addition, the reservoir 3 is fixed to the base body 10 through a connection portion (not shown), which is formed on the upper surface of the base body 10 to protrude from the upper surface.

Each of the reservoir union ports has a cylindrical shape, and communicates with the first cylinder bore 11a through a bore extending from the bottom surface of the reservoir union port toward the first cylinder bore 11a. Liquid feeding ports (not shown) which are arranged to protrude from the lower portion of the reservoir 3 are connected to the reservoir union ports, and the container body of the reservoir 3 is placed on the tops of the reservoir union ports.

The housing attaching portion 14 is arranged on a side surface of the base body 10. The housing attaching portion 14 is a portion arranged as a mounting seat for the housing 20. The housing attaching portion 14 has a flange-like shape. Female screws (not shown) are formed in the upper end portion and the lower end portion of the housing attaching portion 14 such that the housing 20 can be fixed to the housing attaching portion 14 (on the side surface of the base body 10) by screw engagement of mounting screws 16 with the female screws as illustrated in FIG. 2A.

Although not shown, three valve mounting bores and two sensor installation bores are formed in the housing attaching portion 14. The normally-open shutoff valves 4 and 5 and the normally-closed shutoff valve 6 (which are illustrated in FIG. 1) are installed in the three valve mounting bores, and the pressure sensors 7 and 8 (which are illustrated in FIG. 1) are installed in the two sensor installation bores.

The piping connection portion 15 is a portion arranged as a tube mounting seat, and formed in the front portion of the base body 10 as illustrated in FIG. 2A. Two output ports 15a and 15b and two input ports 15c and 15d are formed in the piping connection portion 15 as illustrated in FIG. 2B. Tubes Ha and Hb extending to the hydraulic control device A3 are connected to the output ports 15a and 15b, and tubes Hc and Hd extending to the motor cylinder device A2 are connected to the input ports 15c and 15d (as illustrated in FIG. 1).

The housing 20 includes a housing body 21 and a lid member 30. The housing body 21 liquid tightly covers the components installed in the housing attaching portion 14 (i.e., the normally-open shutoff valves 4 and 5, the normally-closed shutoff valve 6, and the pressure sensors 7 and 8 as illustrated in FIG. 1). The housing body 21 is attached to an opening of the housing body 21.

Although not shown, solenoid coils for actuating the normally-open shutoff valves 4 and 5 and the normally-closed shutoff valve 6, bus-bars extending to the solenoid coils and the pressure sensors 7 and 8, and other components are contained inside the circumferential wall portion of the housing body 21.

The flange portion 22 is a portion which is attached and pressed to the housing attaching portion 14. (Hereinafter, see FIG. 2B for the housing attaching portion 14.) The flange portion 22 is formed to externally extend from the housing body 21 and continuously extend to boss portions 22a to 22d as mounting screw portions.

The boss portions 22a to 22d are arranged at four corners of the housing body 21, respectively, in correspondence with the positions of the female screws in the housing attaching portion 14. Metallic collars are embedded in the respective boss portions 22a to 22d, and screw insertion bores (screw bores) functioning as insertion bores are formed inside the metallic collars. In addition, the mounting screws 16 (as illustrated in FIG. 2A) as fastening members are respectively inserted in the screw insertion bores. The housing 20 can be firmly fixed to the housing attaching portion 14 of the base body 10 (illustrated in FIG. 2A) by evenly fastening the mounting screws 16.

As illustrated in FIG. 2A, a flange portion 22b1 continuously extending to the boss portion 22b has an inclined lower surface. The inclination of the flange portion 22b1 corresponds to the inclination of a first inclined edge portion 232 in the circumferential wall portion 23. The first inclined edge portion 232 is explained later. Thus, the space is saved.

In addition, a circumferential groove (not shown) is formed on a surface, opposed to the housing attaching portion 14, of the flange portion 22, and a sealing member formed of a synthetic rubber is fitted into the circumferential groove. Fastening with the mounting screws 16 causes the sealing member to adhere to the housing attaching portion 14 and play a roll of maintaining the liquid tightness of the housing body 21.

As illustrated in FIG. 2A, the reservoir 3 includes the tube connection port 3c and a connection flange (not shown) as well as the oil feeding ports 3a and 3b (illustrated in FIG. 1). The tube connection port 3c protrudes forward from the container body 3e, which reserves the brake fluid. The aforementioned hose extended from the main reservoir (not shown) is connected to the tube connection port 3c. The connection flange is arranged to protrude from the lower surface of the container body 3e, placed on the reservoir mounting portions 13 (illustrated in FIG. 2B), and fixed to the connection portion of the base body 10 with a spring pin (not shown).

Figure 3:
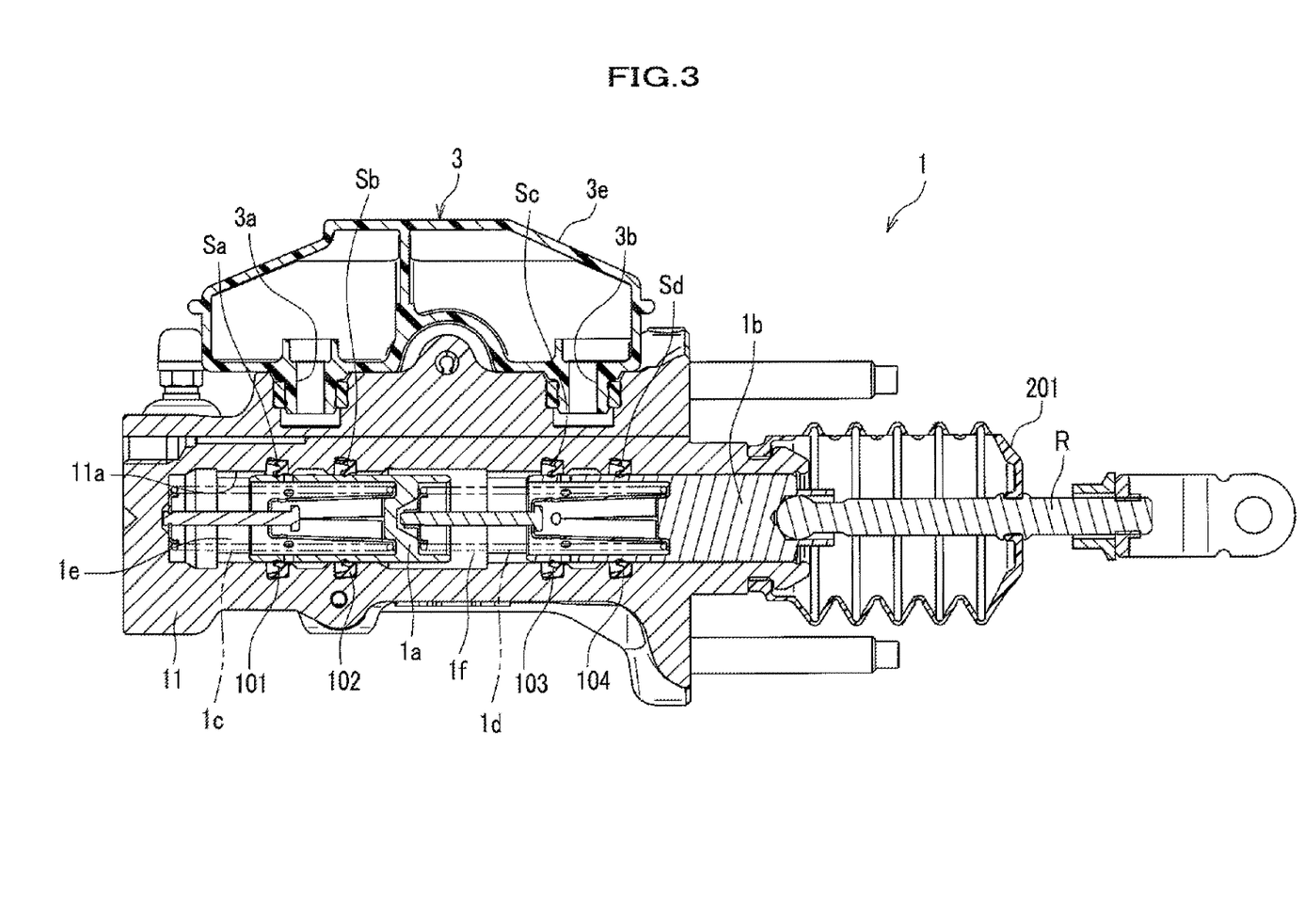
FIG. 3 is a cross-sectional view of the motor cylinder device at the cross section indicated by the arrows X1 in FIG. 2B.

Next, the internal structure of the cylinder portion 11 is explained below with reference to FIG. 3. The return springs 1c and 1d (illustrated in FIG. 1) are not shown in FIG. 3, and the explanations are focused on the portions related to the piston push-rod assembly according to the present invention. As illustrated in FIG. 3, annular sealing members Sa and Sb are arranged in annular recesses 101 and 102, which are formed on an inner circumferential surface of the cylinder portion 11. The sealing members Sa and Sb liquid tightly fill up the gap between the inner circumferential surface of the cylinder portion 11 and the outer circumferential surface of the first piston 1a. Similarly, annular sealing members Sc and Sd are arranged in annular recesses 103 and 104, which are formed on the inner circumferential surface of the cylinder portion 11. The sealing members Sc and Sd liquid tightly fill up the gap between the inner circumferential surface of the cylinder portion 11 and the outer circumferential surface of the second piston 1b. That is, the master cylinder 1 is a so-called plunger-type master cylinder, in which the sealing members Sa to Sd are arranged on the cylinder portion 11 side. The sliding surfaces of the first piston 1a and the second piston 1b as described above, which slide on the inner circumferential surface of the first cylinder portion 11, are coated by plating. In addition, the end portion of the cylinder portion 11 on the brake pedal P side and a portion of the cylinder portion 11 on the cylinder portion 11 side are covered by a rubber boot 201.

<Piston Push-Rod Assembly>

Figure 4A:
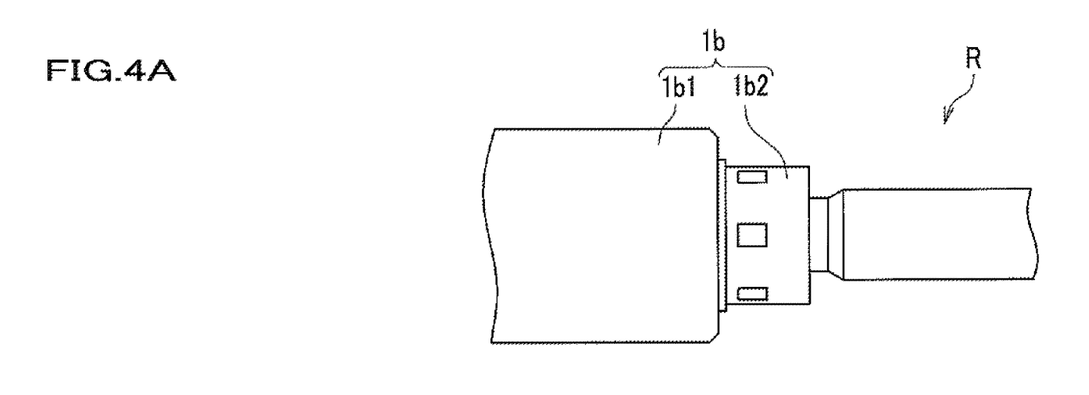
FIG. 4A is a magnified view of a portion connecting a second piston and a push rod.
Figure 4B:
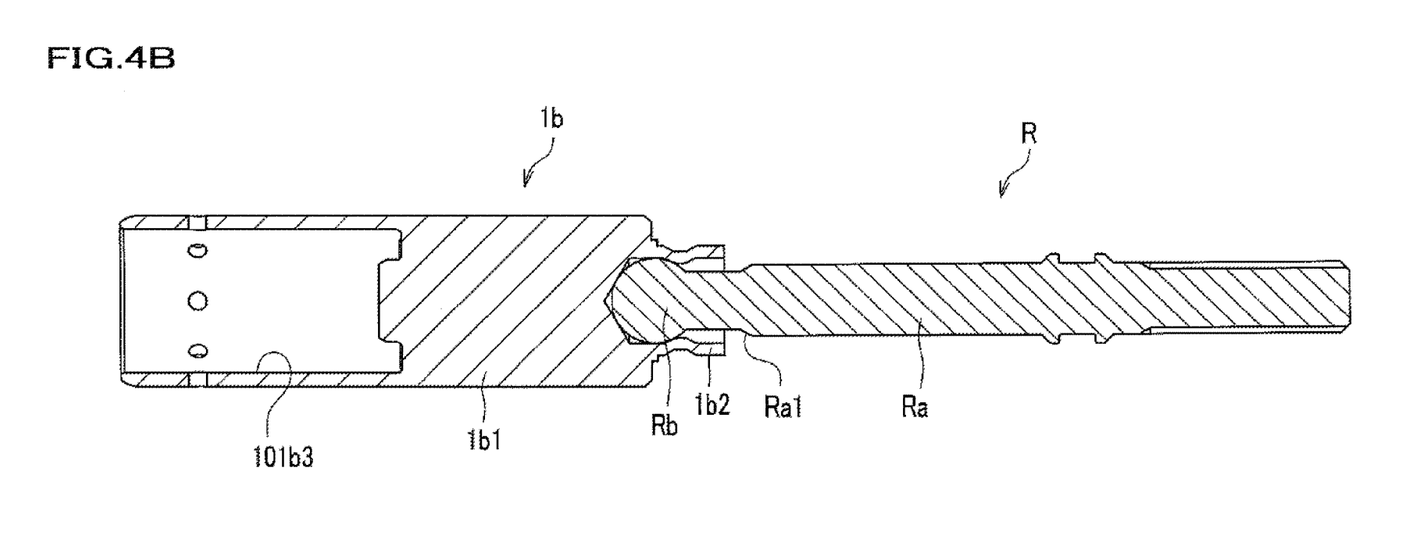
FIG. 4B is a cross-sectional view of the piston push-rod assembly.

Next, a piston push-rod assembly according to an embodiment of the present invention is explained in detail. As illustrated in FIGS. 4A and 4B, the second piston $1b$ and the push rod R are connected to each other to form the piston push-rod assembly.

<Second Piston>

The second piston $1b$ is a metallic member constituted by a piston sliding portion $1b1$ having a columnar shape and a tubular connection portion $1b2$ having a cylindrical shape, which are integrally formed. The piston sliding portion $1b1$ and the tubular connection portion $1b2$ are concentrically arranged, and the piston sliding portion $1b1$ has a greater diameter than the tubular connection portion $1b2$.

The piston sliding portion $1b1$ is slidably contained in the first cylinder bore $11a$ in the cylinder portion $11$ (as illustrated in FIG. 3). The outer circumferential surface of the piston sliding portion $1b1$ is coated by plating for rust prevention. The plating is preferably nickel plating, and more preferably electroless (chemical) plating.

The tubular connection portion $1b2$ is integrally formed on the brake pedal P side of the piston sliding portion $1b1$, and connected to the push rod R. The outer circumferential surface and the inner circumferential surface of the tubular connection portion $1b2$ are unplated portions, which are exposed from the plating.

<Push Rod>

The push rod R is a rod-shaped metallic member having one end connected to the brake pedal P and another end connected to the second piston $1b$, and includes a columnar portion Ra and a spherical portion Rb, which is arranged on the other end of the columnar portion Ra.

The second piston $1b$ and the push rod R as explained above are coupled by clamping the tubular connection portion $1b2$ in the state in which the spherical portion Rb is inserted in the tubular connection portion $1b2$. That is, the tubular connection portion $1b2$ and the spherical portion Rb constitute a so-called universal joint, and the push rod R can tilt to every direction with respect to the second piston $1b$.

<Manufacturing Method>

Figure 5A:
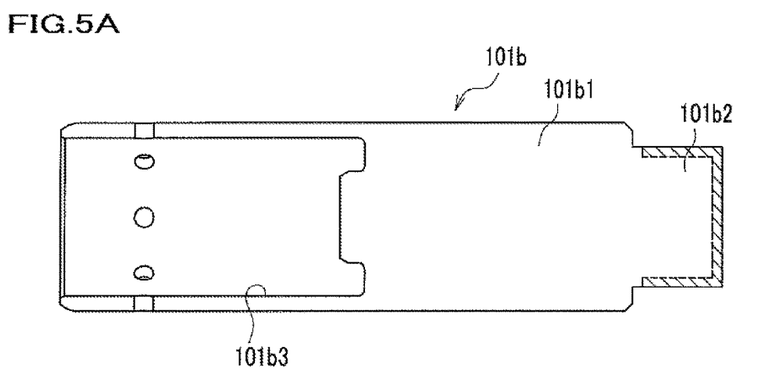
FIGS. 5A to 5C are schematic diagrams presented for illustrating a manufacturing method for the piston push-rod assembly.

Next, a manufacturing method for the piston push-rod assembly is explained below. At first, as illustrated in FIG. 5A, a piston part $101b$ including a large-diameter portion $101b1$ and a small-diameter portion $101b2$ is prepared, and plated in a plating step. That is, the entire outer circumferential surface of the piston part $101b$ is coated by plating. In addition, a chuck portion $101b3$ having a bottomed cylindrical shape is formed in advance on the end face of the large-diameter portion $101b1$ on the side opposite to the small-diameter portion $101b2$, and the inner circumferential surface of the chuck portion $101b3$ is also coated by plating in the plating step.

Figure 5B:
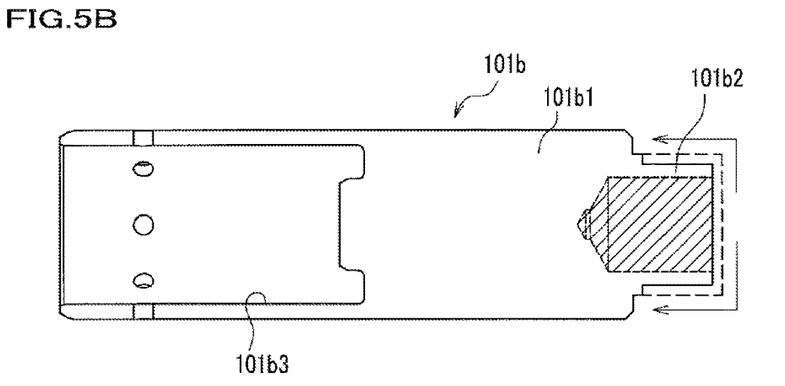

Subsequently, in a cutting step including a plating removal step, as illustrated in FIG. 5B, the inner circumferential surface of the chuck portion $101b3$ is chucked by use of a jig (not shown) to fix the piston part $101b$ to the jig, and the piston part $101b$ is rotated together with the jig. While the piston part $101b$ is rotated, cutting of the end face of the small-diameter portion $101b2$ is performed from the center of the end face toward the outer circumference with a cutting tool (not shown), and cutting of the outer circumferential surface of the small-diameter portion $101b2$ is performed from the end toward the large-diameter portion $101b1$. Thus, the surface (the hatched portion) of the small-diameter portion $101b2$ illustrated in FIG. 5A is removed, and the outer circumferential surface of the small-diameter portion $101b2$ becomes an unplated area, which is exposed from the plating.

Figure 5C:
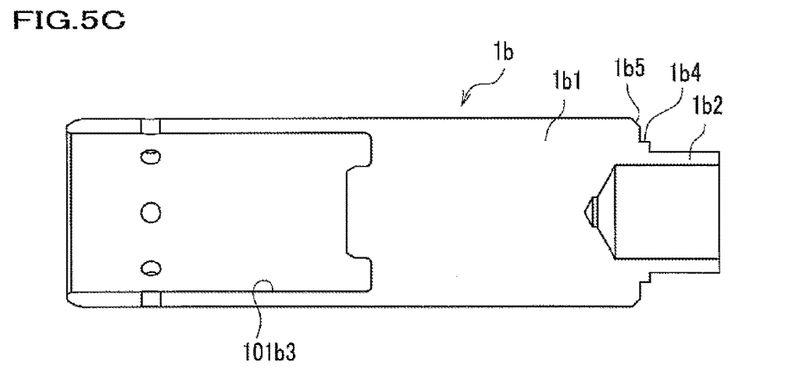

Thereafter, in a cutting step and a step for producing the tubular connection portion, as illustrated in FIG. 5C, while the piston part $101$ is rotated together with the jig, cutting of the small-diameter portion $101b2$ is performed from the center of the end face toward the large-diameter portion $101b1$ to form a bottomed bore such that the bottom of the bore penetrates into the large-diameter portion $101b1$. Thus, the hatched portion of the small-diameter portion $101b2$ illustrated in FIG. SB is removed by the cutting, so that the tubular connection portion $1b2$ is formed and the second piston $1b$ is obtained. At this time, the large-diameter portion $101b1$ becomes the piston sliding portion $1b1$. That is, the outer circumferential surface of the piston sliding portion $1b1$ is coated with the plating, and the outer circumferential surface and the inner circumferential surface of the tubular connection portion $1b2$ are unplated areas, which are exposed from the plating. If the plating step is performed after formation of the tubular connection portion $1b2$, a step for removing the plating on the inner circumferential surface of the tubular connection portion $1b2$ is necessary. However, the formation of the tubular connection portion $1b2$ by cutting after the plating step as mentioned before simplifies the process. According to the present embodiment, the outer circumferential surface of the piston sliding portion $1b1$, a connection surface (the end face of the piston sliding portion $1b1$) connecting the outer circumferential surface of the piston sliding portion $1b1$ and the outer circumferential surface of the tubular connection portion $1b2$, and the outer circumferential surface of a step portion $1b4$ which is left in the edge portion of the tubular connection portion $1b2$ on the piston sliding portion $1b1$ side are continuously coated by plating. Since the step portion $1b4$ is also coated by the plating, the piston sliding portion $1b1$ can be preferably protected from rusting even when sliding of the second piston $1b$ causes intrusion of water or the like. In addition, since a tapered portion is formed at the corner portion between the outer circumferential surface of the piston sliding portion $1b1$ and the outer circumferential surface of the tubular connection portion $1b2$, it is possible to prevent occurrence of cracks and exfoliation of the plating on the corner portion.

After that, as illustrated in FIGS. 4A and 4B, the second piston $1b$ and the push rod R are connected to each other by inserting the spherical portion Rb of the push rod R in the tubular connection portion $1b2$, and crimping the circumferential wall of the tubular connection portion $1b2$, so that the piston push-rod assembly is obtained.

Figure 6A:
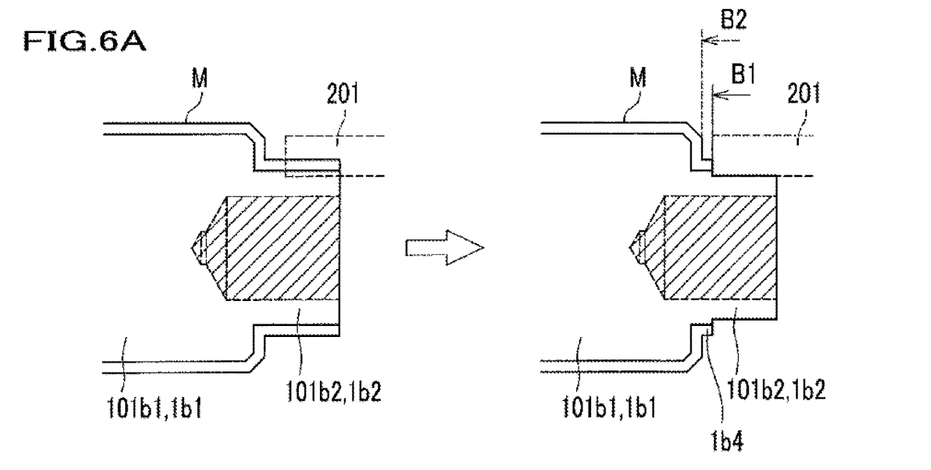
FIGS. 6A to 6C are schematic diagrams presented for illustrating the extent of removal of plating in a cutting step.
Figure 6B:
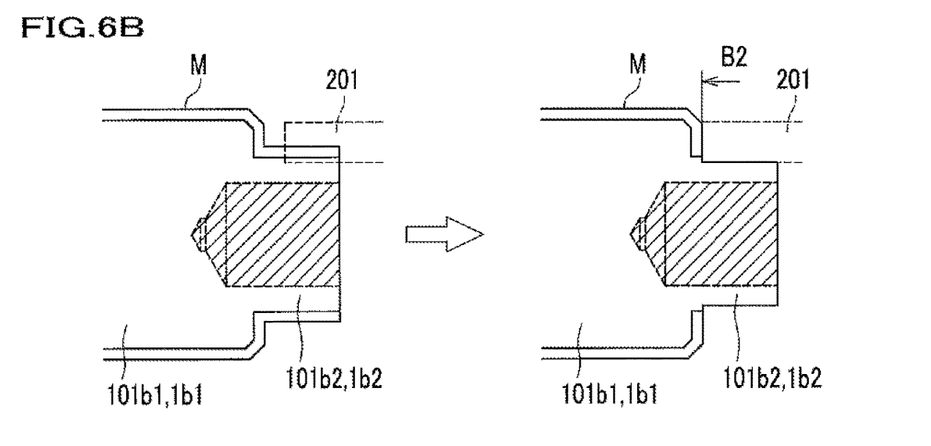
Figure 6C:
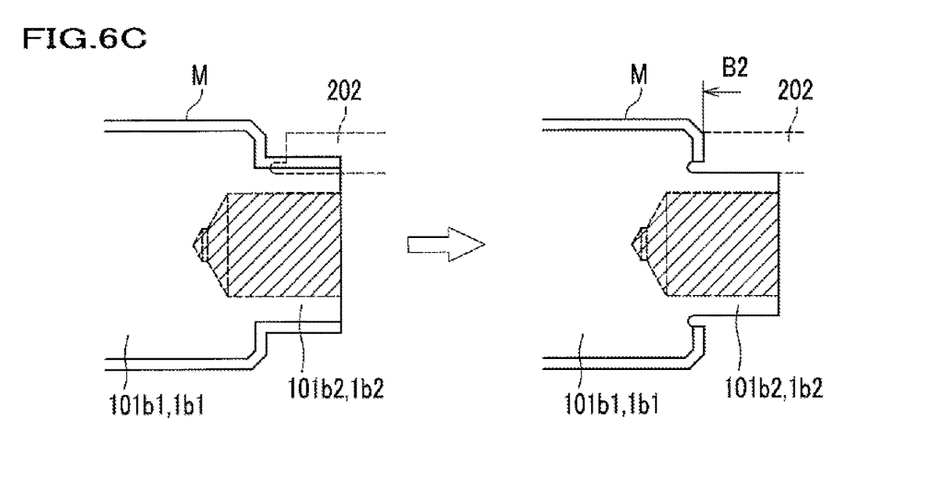

At this time, it is desirable that the plating (the plating layer) M continuously coat the area from the outer circumferential surface of the large-diameter portion $101b1$ (the piston sliding portion $1b1$) to the connection surface (the end face of the large-diameter portion $101b1$) connecting the large-diameter portion $101b1$ and the small-diameter portion $101b2$ (the tubular connection portion $1b2$) as illustrated in FIGS. 6A to 6C. This is a measure for improving the resistance of the plating M to exfoliation. FIGS. 6A to 6C are diagrams for ease of understanding of the regions coated with the plating M, and do not indicate the actual thickness of the plating M.

In order to obtain the above structure, for example, as illustrated in FIG. 6A, the small-diameter portion $101b2$ is cut to the face B1 by using a cutting tool $201$ having a cutting face parallel to the connection surface, so as to leave the plating M on the end portion of the outer circumferential surface of the small-diameter portion 101b2 on the tubular connection portion 1b2 side. According to the above manner of cutting, the coating, with the plating M, of the area including the connection surface can remain with high reliability. Alternatively, as illustrated in FIG. 6B, it is possible to cut the small-diameter portion 101b2 to the face B2 beyond the face B1 by using the cutting tool 201 so as to leave the plating M on the connection surface. Further alternatively, as illustrated in FIG. 6C, it is possible to cut an end portion of the connection surface on the small-diameter portion 101b2 side by using a cutting tool 202 so as to leave the plating M on the other portion of the connection surface, where the cutting tool 202 has a cutting face the internal end portion of which protrudes.

Figure 7A:
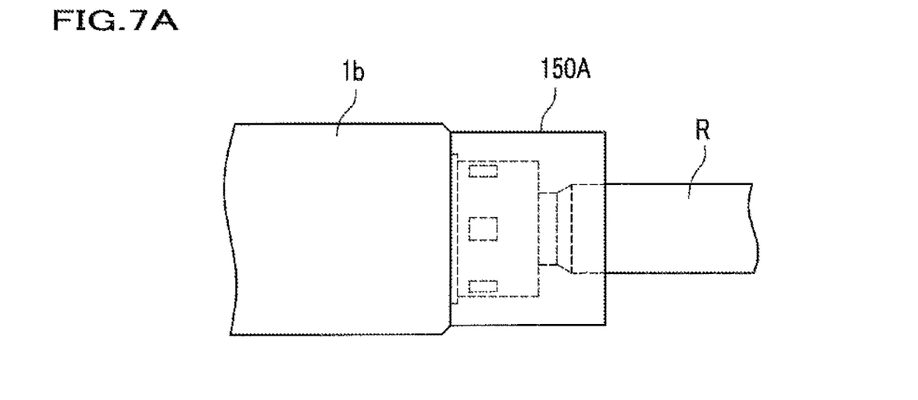
FIG. 7A is a side view.
Figure 7B:
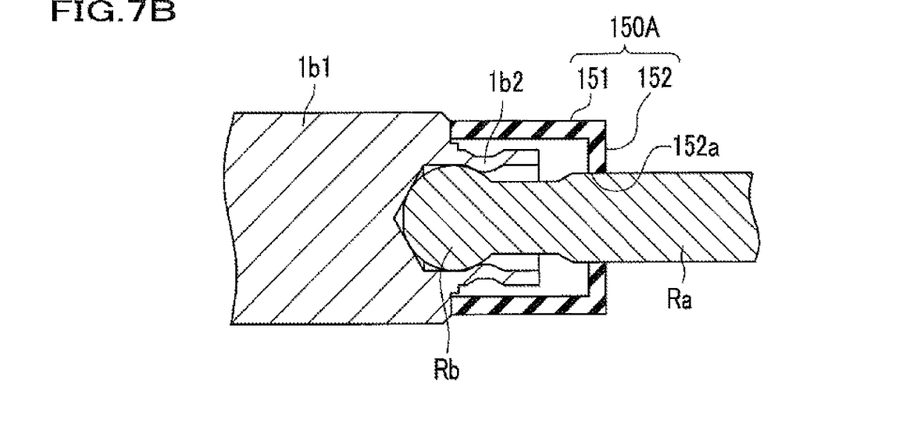
FIGS. 7B and 7C are partially magnified cross-sectional views.

Further, the piston push-rod assembly according to the embodiment of the present invention may have a structure provided with a cover member 150A which covers the tubular connection portion as illustrated in FIGS. 7A and 7B. The cover member 150A is a member formed of resin, and has the shape of a bottomed cylinder which does not interfere with the motion of the push rod R. The cover member 150A includes a cylindrical portion 151 and a bottom portion 152. An end face of the cylindrical portion 151 abuts the connection surface connecting the outer circumferential surface of the piston sliding portion 1b1 and the outer circumferential surface of the tubular connection portion 1b2. A bore 152a is formed in the bottom portion 152, and the push rod R is inserted through the bore 152a in such a manner that the inner circumferential surface of the bore 152a is in contact with the outer circumferential surface of the columnar portion Ra.

Figure 7C:
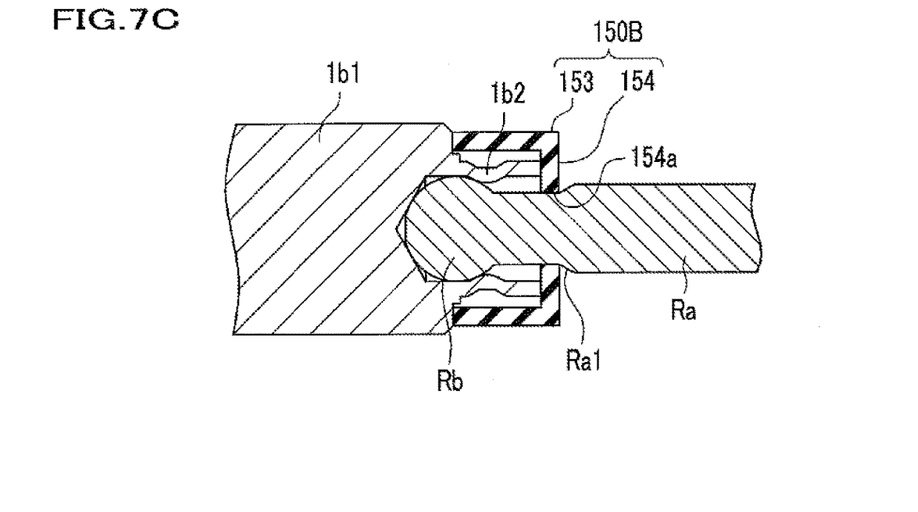

Alternatively, the piston push-rod assembly according to the embodiment of the present invention may have a structure provided with a cover member 150B which covers the tubular connection portion as illustrated in FIG. 7C. The cover member 150B is a member formed of resin or rubber, and has the shape of a bottomed cylinder which does not interfere with the motion of the push rod R. The cover member 150B includes a cylindrical portion 153 and a bottom portion 154. An end face of the cylindrical portion 153 abuts the connection surface connecting the outer circumferential surface of the piston sliding portion 1b1 and the outer circumferential surface of the tubular connection portion 1b2. A bore 154a is formed in the bottom portion 154, and the push rod R is inserted through the bore 154a in such a manner that the inner circumferential surface of the bore 154a is in contact with the outer circumferential surface of the columnar portion Ra. A waist portion Ra1 is formed on the outer circumferential surface of the columnar portion Ra. The diameter of the columnar portion Ra is larger on the brake pedal P side than in the waist portion Ra1, and the inner circumferential surface of the bore 154a of the cover member 150B abuts the waist portion Ra1, so that the sealability is improved.

In the piston push-rod assembly according to the embodiment of the present invention, the piston sliding portion 1b1 is coated with the plating M, and the outer circumferential surface and the inner circumferential surface of the tubular connection portion 1b2 are the unplated areas exposed from the plating M. Therefore, it is possible to prevent cracks and exfoliation of the plating M which can be caused by the clamping, and also prevent causing the driver to feel a sense of incongruity when the driver manipulates the brake pedal P.

In addition, since the area including the connection surface connecting the outer circumferential surface of the tubular connection portion 1b2 and the outer circumferential surface of the piston sliding portion 1b1 is coated with the plating M in the piston push-rod assembly according to the embodiment of the present invention, it is possible to improve the resistance to exfoliation of the plating M.

Further, since the piston push-rod assembly according to the embodiment of the present invention is provided with the cover member 150A (or the cover member 150B), it is possible to prevent rusting of the tubular connection portion 1b2 exposed from the plating M, and also prevent intrusion of foreign substances into the tubular connection portion 1b2.

Although an embodiment of the present invention is explained above, the present invention is not limited to the explained embodiment, and the present invention can be modified as needed without departing from the gist of the present invention. For example, in the manufacturing method for the piston push-rod assembly, a piston production step may replace the plating step and the cutting step. In the piston production step, a piston which includes a tubular connection portion having an unplated portion is produced by preparing a piston part in which the tubular connection portion is formed, and plating the piston part with masking. In addition, in the piston production step, a cutting step of producing the tubular connection portion by cutting the small-diameter portion 1b2 may be performed after a plating step of plating the small-diameter portion 1b2 with masking is performed. In this case, a plating removal step in the cutting step can be dispensed with. Further, the manner of connecting the second piston 1b and the push rod R is not limited to crimping, and instead the spherical portion Rb may be pushed into the tubular connection portion 1b2.

LIST OF REFERENCES

1: Master Cylinder
1b: Second Piston (Piston)
1b1: Piston Sliding Portion
1b2: tubular connection portion (Cylinder)
11: Cylinder Portion (Cylinder)
101b: Piston Part
101b1: Large-diameter Portion
101b2: Small-diameter Portion
M: Plating
R: Push Rod
Ra1: Waist Portion

The invention claimed is:

1. A piston push-rod assembly in which a piston for a master cylinder is connected to a push rod, the piston push-rod assembly comprising:
the push rod;
a brake piston comprising a piston sliding portion which is configured to be contained in a cylinder bore formed inside of a brake master cylinder and to slide relative to the cylinder, the brake piston further comprising a tubular connection portion which is integrally formed with the piston sliding portion and operatively connected to the push rod, the tubular connection portion having a diameter smaller than the piston sliding portion;
wherein:
the piston sliding portion is coated with plating, and the tubular connection portion includes an unplated portion which engages an end portion of the push rod, and
the plating is arranged on an area extending inwardly from an outer circumferential surface of the piston sliding portion on to a connection surface connecting the outer circumferential surface of the piston sliding portion and an outer circumferential surface of the tubular connection portion, whereby the plating is provided on both sliding and selected non-sliding surfaces of the brake piston.

2. The piston push-rod assembly according to claim 1, wherein the unplated portion is arranged on an inner circumferential surface and an outer circumferential surface of the tubular connection portion.

3. The piston push-rod assembly according to claim 2, further comprising a cover member which covers the tubular connection portion, wherein the tubular connection portion has a diameter smaller than the piston sliding portion, the cover member has a cylindrical shape with a bottom having a bore formed therein, the piston rod is inserted through the bore of the cover member, and an end portion of the cover member on an opening side abuts a connection surface connecting the outer circumferential surface of the piston sliding portion and an outer circumferential surface of the tubular connection portion.

4. A master cylinder comprising:
the piston push-rod assembly according to claim 2;
the cylinder bore containing the piston sliding portion; and
a sealing member which is received in a recess formed on an inner circumferential surface of the cylinder.

5. A brake master cylinder comprising:
the piston push-rod assembly according to claim 1, the cylinder bore containing the piston sliding portion; and a sealing member which is received in a recess formed on an inner circumferential surface of the cylinder bore.

6. A piston push-rod assembly in which a piston for a master cylinder is connected to a push rod, the piston push-rod assembly comprising:
the push rod;
a brake piston comprising a piston sliding portion which is configured to be contained in a cylinder bore formed inside of a brake master cylinder and to slide relative to the cylinder, the brake piston further comprising a tubular connection portion which is integrally formed provided with the piston sliding portion and operatively connected to the push rod,
wherein the piston sliding portion is coated with plating, and the tubular connection portion includes an unplated portion which engages an end portion of the push rod,
the piston push-rod assembly further comprising a cover member which covers the tubular connection portion, wherein the tubular connection portion has a diameter smaller than the piston sliding portion, the cover member has a cylindrical shape with a bottom, a bore is formed in the bottom, the piston rod is inserted through the bore, and an end portion of the cover member on an opening side abuts a connection surface connecting the outer circumferential surface of the piston sliding portion and an outer circumferential surface of the tubular connection portion.

7. The piston push-rod assembly according to claim 6, wherein a waist portion, which an inner circumferential surface of the bore abuts, is formed on an outer circumferential surface of the piston rod.

8. A master cylinder comprising:
the piston push-rod assembly according to claim 7;
the cylinder bore containing the piston sliding portion; and
a sealing member which is received in a recess formed on an inner circumferential surface of the cylinder.

9. A master cylinder comprising:
the piston push-rod assembly according to claim 6;
the cylinder bore containing the piston sliding portion; and
a sealing member which is received in a recess formed on an inner circumferential surface of the cylinder.

10. A method for manufacturing a piston push-rod assembly in which a piston for a master cylinder is operatively connected to a push rod, the method comprising:
a plating step of plating an exterior surface of a part including a first portion which is configured to become the piston, and a second portion which is configured to become a tubular connection portion integral with the piston;
a cutting step of producing the piston and the tubular connection portion, by cutting the plated part to form the piston having the outer sliding surface which remains plated, and the tubular connection portion which includes an unplated outer surface from which the plating is removed during the cutting step, and an uplated inner surface, wherein some plating remains on both sliding and selected non-sliding portions of the part at the conclusion of the cutting step; and
a connecting step of connecting the piston with the push rod in a state in which the push rod is inserted in the tubular connection portion such that an end portion of the push rod engages the unplated inner surface portion of the tubular connection portion.

11. The method for manufacturing a piston push-rod assembly according to claim 10, wherein in the cutting step, the tubular connection portion is formed out of the second portion of the plated part, by cutting, to remove at least a portion of the plating from, and to form a recess in the second portion of the part.

12. The method for manufacturing a piston push-rod assembly according to claim 10, wherein the part includes the first portion which is a large-diameter portion, and the second portion which is a small-diameter portion which are integrally formed; and
in the cutting step, a piston sliding portion which is configured to be contained in a cylinder and slide relative to the cylinder is produced from the large-diameter first portion, and the tubular connection portion is produced from the small-diameter second portion, and the cutting step is performed so as to preserve the plating in an area from an outer circumferential surface of the large-diameter first portion to a connection surface, connecting the outer circumferential surface of the large-diameter first portion and an outer circumferential surface of the small-diameter second portion.

13. A method for manufacturing a piston push-rod assembly in which a piston for a master cylinder is connected to a push rod, said method comprising the steps of:
a piston production step of producing the piston including an integral tubular connection portion by plating a piston part, which is configured to slide in a cylinder, the piston part provided with masking such that the finished piston includes plating on both sliding and selected non-sliding surfaces thereof, wherein the tubular connection portion includes a portion which is not plated;
and a connection step of connecting the piston with the push rod in a state in which an end portion of the push rod is inserted into the portion of the tubular connection portion which is not plated.

* * * * *